(12) United States Patent
Sabio et al.

(10) Patent No.: US 8,992,680 B2
(45) Date of Patent: Mar. 31, 2015

(54) FAST HYDRAULIC BINDER FOR PARTS AND CONSTRUCTIONS MADE OF CONCRETE CONTAINING A CALCIUM SALT

(75) Inventors: Serge Sabio, Saint Just Chaleyssin (FR); David Rinaldi, Saint Jean de Gonville (FR); Jean-Michel Laye, Chennai (IN); Isabelle Sgro, Villefontaine (FR); Horacio Naranjo, Jardin (FR); Bruno Pellerin, Avon (FR); Pascal Boustingorry, Breuillet (FR)

(73) Assignee: LAFARGE, Paris (FR)

( * ) Notice: Subject to any disclaimer, the term of this patent is extended or adjusted under 35 U.S.C. 154(b) by 0 days.

(21) Appl. No.: 13/211,737

(22) Filed: Aug. 17, 2011

(65) Prior Publication Data
US 2012/0041103 A1 Feb. 16, 2012

Related U.S. Application Data

(63) Continuation of application No. PCT/IB2010/050694, filed on Feb. 16, 2010.

(30) Foreign Application Priority Data

Feb. 17, 2009 (FR) ..................................... 09 00706

(51) Int. Cl.
| | | |
|---|---|---|
| C08K 3/00 | (2006.01) | |
| C04B 24/12 | (2006.01) | |
| C04B 7/00 | (2006.01) | |
| C04B 24/00 | (2006.01) | |
| C04B 26/00 | (2006.01) | |
| C04B 40/00 | (2006.01) | |
| C04B 28/02 | (2006.01) | |
| C04B 103/10 | (2006.01) | |
| C04B 111/00 | (2006.01) | |

(52) U.S. Cl.
CPC ............. *C04B 40/0039* (2013.01); *C04B 28/02* (2013.01); *C04B 2103/10* (2013.01); *C04B 2111/00103* (2013.01)
USPC ........... 106/713; 106/727; 106/819; 106/823; 524/2

(58) Field of Classification Search
USPC .................. 106/727, 819, 823, 713; 524/2
See application file for complete search history.

(56) References Cited

U.S. PATENT DOCUMENTS

| | | | |
|---|---|---|---|
| 5,911,819 A | | 6/1999 | Drs et al. |
| 6,008,275 A | | 12/1999 | Moreau et al. |
| 6,869,474 B2 | * | 3/2005 | Perez-Pena et al. .......... 106/727 |
| 2003/0127026 A1 | | 7/2003 | Anderson et al. |
| 2003/0144384 A1 | * | 7/2003 | Chen et al. ........................ 524/2 |
| 2003/0199616 A1 | | 10/2003 | Yamashita et al. |
| 2004/0149172 A1 | * | 8/2004 | Jardine et al. ................. 106/724 |
| 2004/0149174 A1 | | 8/2004 | Farrington et al. |
| 2006/0207479 A1 | * | 9/2006 | Hughes .......................... 106/705 |
| 2006/0266977 A1 | * | 11/2006 | Dubois-Brugger et al. . 252/79.1 |

FOREIGN PATENT DOCUMENTS

| | | | |
|---|---|---|---|
| EP | 0537872 | | 4/1993 |
| EP | 1893548 | | 3/2008 |
| FR | 27762885 | | 9/1999 |
| FR | 2827594 A1 | | 1/2003 |
| WO | WO 97/19032 | * | 5/1997 |
| WO | WO/2010/095097 | | 8/2010 |

OTHER PUBLICATIONS

International Search Report for PCT/IB2010/050694 issued May 17, 2010; 6 pages.
Specification and Guidelines for Self-Compacting Concrete; EFNARC, 2002; pp. 19-23.
Euopean Standard; Jun. 2000; "Cement" EN 197-1.
French Standard; Dec. 1981; NF p. 18-451.
A. Schwarzentruber; "La methode du mortier de beton equivalent (MBE)—Un nouvel outil d'aide a la formulation des betons adjuvantes"; Materials and Structures, vol. 33/ No. 8, Oct. 2000.
European Standard EN934-2, Jun. 2000.

* cited by examiner

*Primary Examiner* — James J Seidleck
*Assistant Examiner* — Deve E Valdez
(74) *Attorney, Agent, or Firm* — Additon, Higgins & Pendleton, P.A.

(57) ABSTRACT

A fast hydraulic binder comprising cement, at least one first superplasticizer, a calcium salt, and at least one second superplasticizer different from the first superplasticizer and comprising a main chain and pendant groups connected to the main chain adapted so as to separate from the main chain in a basic medium, wherein the result is that the second plasticizer has a fluidifying action which increases at least temporarily over time in a basic medium.

21 Claims, 5 Drawing Sheets

FAST HYDRAULIC BINDER FOR PARTS AND CONSTRUCTIONS MADE OF CONCRETE CONTAINING A CALCIUM SALT

CROSS-REFERENCE TO PRIORITY APPLICATIONS

This application is a continuation and claims the benefit of the commonly assigned International Patent Application No. PCT/IB2010/050694 (filed Feb. 16, 2010, in the European Patent Office), and the commonly assigned French Patent Application Serial No. 09 00 706 (filed Feb. 17, 2009, in the French Patent Office), both of which are hereby incorporated by reference in their entirety.

FIELD OF THE INVENTION

The invention relates to compositions of fast hydraulic binder comprising a calcium salt, used for making concrete parts and structures, are the object of the invention.

BACKGROUND

By fast hydraulic binders for mortar or concrete, are meant hydraulic binders with fast setting and hardening. Concretes using such binders in their composition, once they are applied, acquire significant mechanical characteristics in the short term. Preferably they have a compression strength RC of at least one 1 MPa after 4 hours for fluid concrete and of at least 1 MPa after 5 hours for self-placing (or self-compacting) concrete and of at least 12 MPa after 24 hours.

These concretes are fluid or self-placing (or self-compacting) concretes and have a workability duration from a minimum of 1 hour to a maximum of 2 hours.

The workability of fluid concretes is measured by the slump height at the Abrams Cone or—or slump value—(according to the French standard NF P 18-451 of December 1981) and it is estimated that a concrete is fluid when this slump is of at least 150 mm, preferably at least 180 mm.

The workability of self-placing (or self-compacting) concrete is generally measured from slump flow, or spreading, according to the operating procedure described in the document entitled "Specification and Guidelines for Self-Compacting Concrete, EFNARC, February 2002, P19-23"; the value of the spreading is greater than 650 mm for self-compacting concretes (and generally less than 800 mm).

SUMMARY OF THE INVENTION

The invention relates to concretes, and more particularly to fluid or self-placing (or self-compacting) concretes, intended for making parts and structures, whether these are parts which are pre-manufactured in the factory, or constructions on building sites, such as for example concrete shells, flagstones, etc.

Patent application EP 1 893 548 deposited in the name of the applicants describes a fast hydraulic binder comprising cement, at least one superplasticizer, calcium nitrite and at least one formic derivative. The formic derivative may be in the aldehyde form and for example corresponds to formaldehyde.

Although such a fast hydraulic binder may be used in a quite satisfactory way for making a fluid or self-placing (or self-compacting) concrete, it has the drawback of applying a formic derivative, which, at least in the case of formaldehyde, is a toxic compound.

Therefore, there exists a need for a method for making concrete parts and works having a long duration for maintaining workability, leading to fast acquisition of short term mechanical strengths even at temperatures below 10° C., and thus allowing an increase in the re-use rate of formworks, the concrete using a fast hydraulic binder comprising a calcium salt and not comprising any toxic formic derivative.

For this purpose, the present invention proposes a hydraulic binder comprising cement, at least one first superplasticizer, a calcium salt and at least one second superplasticizer different from the first superplasticizer and comprising a main chain and pendant groups connected to the main chain and adapted so as to separate from the main chain in a basic medium, the result of which is that the second plasticizer has a fluidifying action which increases at least temporarily over time in a basic medium.

The invention provides determining advantages, since it allows the making of a fluid or self-compacting (self-placing) concrete from a hydraulic binder not comprising any toxic formic derivative.

In particular, advantageously, the present invention allows the making of easy-to-apply and low cost concrete compositions. These compositions have suitable rheology, preferentially involving a workability time (after mixing) of at least one hour and of a maximum of from one hour and a half to two hours and very fast setting.

Advantageously, the present invention allows the making of a fluid concrete, notably a fluid concrete having after 90 minutes a slump of at least 15 cm, preferably at least 18 cm.

Advantageously, the present invention allows the making of a self-placing concrete, notably a self-placing concrete having after 90 minutes, a spread of more than 650 mm.

Finally, the invention has the advantage of being applicable in all industries, notably the building industry, the chemical industry (producers of adjuvants) and in the whole of the construction markets (building, civil engineering or pre-fabrication factories) of the construction industry and cement industry. In particular, the fast hydraulic binder according to the invention may be used for making and/or repairing road pavements. Further, the fast hydraulic binder according to the invention may be used for accelerated formwork removal of concrete parts, notably for making concrete shells applying rapid formwork removal and for making prefabricated beams.

Other advantages and characteristics of the invention will become clearly apparent upon reading the description and the examples given purely as an illustration and not as a limitation, which follow.

BRIEF DESCRIPTION OF THE DRAWINGS

The foregoing and other objects and advantages of the invention and the manner in which the same are accomplished will become clearer based on the following detailed description taken in conjunction with the accompanying drawings in which.

DETAILED DESCRIPTION

The present invention will now be described more fully hereinafter with reference to the accompanying drawings, in which a preferred embodiment of the invention is shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

The invention relates to a fast hydraulic binder comprising cement, at least one first superplasticizer, one calcium salt and at least one second superplasticizer, different from the first superplasticizer and comprising a main chain and pendant groups connected to the main chain adapted so as to separate from the main chain in a basic medium, the result being that the second superplasticizer has a fluidifying action which increases at least temporarily over time in a basic medium.

The object of the invention is further an accelerator mixture comprising at least one first superplasticizer, one calcium salt and at least one second superplasticizer, different from the first superplasticizer and comprising a main chain and pendant groups connected to the main chain adapted so as to separate from the main chain in a basic medium, the result being that the second plasticizer has a fluidifying action which increases at least temporarily over time in the basic medium.

The object of the invention is further a humid concrete or mortar comprising a fast hydraulic binder according to the invention mixed with water.

By the expression "hydraulic binder", is meant according to the present invention any compound having the property of hydrating in the presence of water and the hydration of which allows a solid to be obtained having mechanical characteristics. The hydraulic binder may be a cement according to the EN 197-1 standard.

By the term "concrete", is meant a mixture of hydraulic binders, of granulates, water, optionally additives and optionally mineral additions such as for example high performance concrete, very high performance concrete, self-placing concrete, self-leveling concrete, self-compacting concrete, fiber concrete, ready-to-use concrete or colored concrete. By the term "concrete", is also meant concretes which have undergone a finishing operation such as roughened concrete, deactivated or washed concrete, or polished concrete. This also means according to this definition pre-stressed concrete. The term "concrete" comprises mortars, in this specific case the concrete comprises a mixture of hydraulic binder, of sand, of water and optionally additives and optionally mineral additions. The term "concrete" according to the invention designates indiscriminately fresh concrete or set concrete.

According to the invention, the term "granulates" designates gravels, grits and/or sand.

According to the invention, the expression "mineral additions" designates slags (as defined in the standard "Ciment" (Cement) NF EN 197-1 paragraph 5.2.2), steelwork slags, pozzolanic materials (as defined in the standard "Ciment" NF EN 197-1 paragraph 5.2.3), flying ashes (as defined in the standard "Ciment" NF EN 197-1 paragraph 5.2.4), calcined schists (as defined in the standard "Ciment" NF EN 197-1 paragraph 5.2.5), limestones (as defined in the standard "Ciment" NF EN 197-1 paragraph 5.2.6) or further a silica fume (as defined in the standard "Ciment" NF EN 197-1 paragraph 5.2.7) or mixtures thereof.

By the expression "Portland Cement", is meant according to the invention a cement of the CEM I, CEM II, CEM III, CEM IV or CEM V type according to the standard "Cement" NF EN 197-1.

By the expression "water reducing agent", is meant an additive which is used for decreasing the amount of water required for making a concrete. As an example, water-reducing agents based on lignosulfonic acid, on carboxylic oxacids or treated carbohydrates may reduce by about 10% to 15% the needs in water for making a concrete.

By the expression "superplasticizer" or "superfluidifier" or "superwater reducing agent", is meant a water-reducing agent which allows reduction by more than 20%, for example by about 30% of the amount of water required for making a concrete. A superplasticizer has a fluidifying action insofar that for a same amount of water, the workability of the concrete is increased in the presence of the superplasticizer.

By the expression "superplasticizer with immediate efficiency", is meant a superplasticizer comprising side chains connected to a main chain, less than 10% of the side chains separating from the main chain in a basic medium at 20° C.

By the expression "superplasticizer with deferred efficiency", is meant a superplasticizer comprising side chains connected to a main chain, at least 10% of the side chains separating from the main chain in a basic medium at 20° C.

By the expression "hydrolyzable polymer", is meant a polymer, the structure of which changes under the effect of hydroxide ions ((OH—) by generating carboxylic acid functions COOH or carboxylate functions COO—. Hydrolyzable chemical functions are in particular, but in a non-limiting way, anhydrides, esters, nitriles, amides and imides.

By the expression "hydrolyzable monomer", is meant a monomer which once it is incorporated into a polymer, affords a hydrolyzable nature to the polymer. As an example, acrylamide and esters of acrylic acid are hydrolyzable monomers.

The expression "polyalkylene oxide polycarboxylate" is meant to refer to comb copolymers with a main polycarboxylate chain bearing side chains grafted with polyalkylene oxide. These polymers are often designated by the acronym PCP.

By the expression "ester level" of a polymer, is meant the proportion of monomer units of the main chain bearing an ester function as defined by the formula below:

wherein R1 designates a group including at least one carbon atom through which it is bound to the oxygen atom of the ester function and * symbolizes the main chain. R1 may notably be an alkyl group or a polyalkylene oxide graft.

The ester level is expressed as a molar percentage and is computed by dividing the number of ester functions on the main chain by the total number of monomer units on the main chain.

According to an exemplary embodiment, the fast hydraulic binder does not comprise any formaldehyde. It may optionally comprise a non-toxic formic derivative such as calcium formate. According to an exemplary embodiment, the fast hydraulic binder does not comprise any formic derivative.

According to an exemplary embodiment, the calcium salt is calcium nitrite. According to another exemplary embodiment, the calcium salt is calcium nitrate with a mixture of calcium nitrite and of calcium nitrate. This salt is present in the composition of the accelerator mixture in amounts which may vary from 50 to 90% by dry weight. Generally, the amount is such that the amount of calcium salt in the final hydraulic binder is comprised between 0.5 and 10%, preferably between 1.5% and 5% by dry weight relatively to the final hydraulic binder. Preferably, the calcium salt is water-soluble. Preferably, the calcium salt is not a calcium carbonate.

The second superplasticizer is a superplasticizer, the fluidifying action of which is not constant over time but increases at least temporarily over time in a basic medium. The second superplasticizer is generally called a dispersant or superplasticizer with delayed efficiency (delayed efficiency dispersant or DED). Preferably, the second superplasticizer does not initially have any fluidifying action. The second superplasticizer may comprise at least one hydrolyzable polymer in a basic medium. During the making of a concrete according to the invention, the obtained composition having a basic pH, hydrolyzis reactions occur which lead to modification of the structure of the hydrolyzable polymer and to a modification of the properties of the hydrolyzable polymer, i.e. an increase in the fluidifying action of the hydrolyzable polymer. According to an exemplary embodiment, the hydrolyzable polymer is of the polyalkylene oxide polycarboxylate type.

Preferably, the superplasticizer comprises side chains connected to a main chain, at least 20% of the side chains separating from the main chain in a basic medium at 20° C., even more preferentially at least 30% of the side chains separating from the main chain in a basic medium at 20° C.

According to an exemplary embodiment, the hydrolyzable polymer is obtained by radical polymerization:
- of at least one ionic or ionizable monomer of the phosphonic, sulfonic or carboxylic type. As an example for phosphonic monomers, this monomer may notably be phosphoethyl methacrylate, the monomers from the Sipomer PAM range marketed by Rhodia. As an example for sulfonic monomers, this monomer may notably be vinyl sulfonic acid and its salts, styrene sulfonic acid and its salts,2-acrylamido-2-methylpropane sulfonic acid and its salts, allyloxyhydroxypropyl sulfonic acid and its salts, methallylsulfonic acid and its salts. As an example for carboxylic monomers, this monomer may notably be acrylic acid, methacrylic acid, maleic acid, fumaric acid, itaconic acid, crotonic acid;
- of at least one monomer of the polyethylene glycol (PEG) (meth)acrylate, polyethylene glycol maleate, polyethylene glycol vinyl ether or polyethylene glycol allyl type, in particular PEG methyl ether (in the terminal position) type, the molecular weight of which is for example comprised between 100 and 10,000, preferably between 350 and 7,000 and advantageously between 350 and 5,000. The monomers of the PEG acrylate type will advantageously be used in this invention because of their hydrolyzable nature; and
- of optionally one or more other hydrolyzable or non-hydrolyzable monomers. Among hydrolyzable monomers, mention may advantageously be made of acrylamide and its derivatives, acrylonitrile and its derivatives, alkyl acrylates such as ethyl acrylate, hydroxyalkyl acrylates such as hydroxyethyl acrylate, vinyl esters of carboxylic acids such as vinyl acetate, copolymerizable carboxylic anhydrides such as maleic anhydride or methacrylic anhydride, monomers with imide functions such as maleimide and its derivatives.

The hydrolyzable monomers account for 5% to 95% molar of the whole of the applied monomers, preferably from 10% to 60% molar of the whole of the applied monomers. The application of these monomers is accomplished according to conditions known to one skilled in the art, notably described in patent FR 2892420.

The same structures may be obtained in an equivalent way by a so-called post-esterification method by reacting alcohols or polyoxyalkylamines on a polymer having carboxylic functions in order to allow grafting. This application method is for example described in patent FR2776285 in the name of Chryso.

Such a hydrolyzable polymer may for example be produced according to the following method.

Raw materials used:
- 120 g of polyacrylic acid marketed by BASF under the name of Sokalan CP10S. Its average molar mass by weight is equal to 4000 Daltons. It is diluted to 50% in water;
- 190 g of a polyethylene glycol methyl ether with an average molar mass by weight equal to 350 Daltons; and
- 0.60 g of lithium hydroxide.

Preparation of the hydrolyzable polymer:

In a glass reactor, equipped with a stirring system, a distillation device and a partial vacuum system, the aforementioned raw materials are introduced, in the following order: polyacrylic acid, lithium hydroxide and polyethylene glycol methyl ether. As soon as the end of the introduction of the polyethylene glycol methyl ether, a partial vacuum (20 to 30 mm Hg) is applied to the reactor with a nitrogen blanket. Next, heating is applied to 60-75° C.: the beginning of distillation of the water provided with polyacrylic acid is achieved. The temperature is then raised to 165-175° C. for esterification. During the esterification reaction, the water formed is removed. After nine hours at 165-175° C., the reaction is stopped. To do this, the reactor is cooled down to a temperature of the order of 80° C. and vacuum distillation is stopped and then 3.2 g of oleyl diethanolamine (marketed under the name of Noramox 02 by C.E.C.A.) and 3.2 g of tributyl phosphate (antifoam agent) are added. Finally, the product is diluted with water in order to obtain a 30% dry extract and is neutralized with sodium hydroxide at a pH equal to 7.1. The thereby prepared polymer is ready to use. In the following of the description, this polymer is called PH. Its theoretical ester level is 65. Its actual ester level is inferred from the measurement of the acid index of the polymer. The acid index of this polymer is 34 mg of KOH for 100 g of dried polymer, which corresponds to an ester level of 62.

The dispersant with 30% of dry extract is evaluated by a workability measurement on mortar. The composition of the mortar is the following:

| Component | Mass (g) |
| --- | --- |
| Cement CEM I 52,5 N Saint-Pierre La Cour | 624.9 |
| Erbray filler | 412.1 |
| AFNOR sand | 1,350 |
| Fulchiron sand | 587.7 |
| Water | 375.1 |

The spreading of the mortar is measured according to the operating procedure described in document "Specification and Guidelines for Self-Compacting Concrete, EFNARC, February 2002, P19-23". The time-dependent change in the spreading is given by the table below.

| Time (min) | Spreading (mm) |
|---|---|
| 5 | 240 |
| 15 | 240 |
| 30 | 290 |
| 60 | 350 |
| 90 | 370 |
| 120 | 350 |

The spreading is constant after short times, but its increase actually shows that the fluidifying effect of this polymer is time-shifted.

The second superplasticizer is present in the composition of the accelerator mixture in amounts which may vary from 1 to 5% by weight, percentages calculated from dry extracts of the constituents of the accelerating mixture. Generally, the amount is such that the amount of the second superplasticizer relatively to the calcium salt, is comprised between 1 and 10% of the amount of calcium salt, preferably between 2 and 5%. Relatively to the weight of the final hydraulic binder, the amount is such that the amount of the second superplasticizer is comprised between 0.01 and 1%, preferably between 0.05 and 0.5% by weight (percentage calculated from the dry extract of the first superplasticizer) relatively to the weight of the fast hydraulic binder.

The first superplasticizer or immediate action superplasticizer, may be any superplasticizer conventionally used in industry, such as those defined in the European standard EN934-2. The first superplasticizer has immediate fluidifying action which tends to decrease over time while the second superplasticizer in a first phase has little or no fluidifying action and has a fluidifying action which increases with time.

It is possible to use as a first superplasticizer, superplasticizers which are of the polyox polyphosphonate or polyox polysulfonate or even better of the polyalkylene oxide polycarboxylate (also called polyox polycarboxylate or PCP). An example of a first superplasticizer is the one described in documents EP-A-537872, US20030127026 and US20040149174, incorporated by reference herein.

An example of a first superplasticizer is the one obtained by polymerization:
  of at least one ionic monomer of the phosphonic, sulfonic or carboxylic type, preferably carboxylic type and advantageously (meth)acrylic type; and
  of at least one monomer of the polyethylene glycol (PEG) (meth)acrylate type, in particular PEG methyl ether (in the terminal position), the molecular weight of which is for example comprised between 100 and 10,000, preferably between 500 and 5,000 and advantageously between 750 and 2,000.

The first monomer/second monomer molar ratio may vary within wide ranges, for example 75:25 to 45:55, preferably 65:35 to 55:45.

It is possible to use one or more third monomer(s), for example those selected from:
  (a) the acrylamide type, for example N,N-dimethylacrylamide, 2,2'-dimethylamino(meth)acrylate or its salts, 2,2'-dimethylaminoalkyl(meth)acrylate or its salts with the alkyl group and in particular ethyl and propyl groups and generally any monomer containing a function of the amine or amide type;
  (b) the hydrophobic type, for example C1-C18 alkyl(meth)acrylate, in particular methyl or ethyl(meth)acrylate.

The amount of this third monomer may be comprised between 5 and 25% by moles of the total of the monomers.

A particular example of a first superplasticizer used in the invention is the one obtained by polymerization of 40 to 65% of (meth)acrylic acid, 25 to 40% of PEG methyl ether (meth) acrylate notably with a molecular weight comprised between 750 and 2,000, and 5 to 25% of a monomer of the type (a) or (b), in particular of the type (a) and notably 2,2'-dimethylaminoalkyl(meth)acrylate.

The first superplasticizer appears in a form which may vary from the liquid form to the solid form, via the waxy form.

The first superplasticizer is present in the accelerator mixture in amounts which may vary from 10 to 30% by weight, the percentages being calculated from dry extracts of the constituents of the accelerator mixture. The dosage of the first superplasticizer relatively to the fast hydraulic binder is generally comprised between 0.1 and 5% by weight (percentages calculated from the dry extract of the first superplasticizer), preferably between 0.1 and 2% by weight based on the weight of the fast hydraulic binder. For a first liquid superplasticizer, generally an amount will be available such that it will be present preferably in an amount from 1 to 10, preferably 2 to 7 L/m$^3$ of the final concrete mixed mixture.

The hydraulic binder or the accelerator mixture may contain other components in addition to the three aforementioned compounds. Mention may notably be made of the following compounds, either alone or as a mixture:
  (i) a thiocyanate of an alkaline or earth alkaline metal or of aluminium;
  (ii) a halide or halogenate of an alkaline or earth alkaline metal or of aluminium;
  (iii) a nitrate of an alkaline or earth alkaline metal or of aluminium;
  (iv) an amine, an alkanolamine, a polyhydroxyalkylamine;
  (v) a thiosulfate of an alkaline or earth alkaline metal or of aluminium;
  (vi) a hydroxide of an alkaline or earth alkaline metal or of aluminium;
  (vii) a carboxylic acid salt of an alkaline or earth alkaline metal or of aluminium;
  (viii) an ether oxide; and
  (ix) sugars.

When the calcium salt is calcium nitrate, calcium, sodium or potassium thiocyanate and/or bromide will for example be used as co-accelerators of calcium nitrite.

The amount of these other compounds associated with the accelerator mixture may for example account for up to 20% by weight of the calcium salt.

With such a combination, it is possible to obtain certain effects for improving the compromise between control of the rheology and fast acquisition of performance.

The fast hydraulic binder intended to form the wet concrete generally comprises, based on the dry weight of the binder:
  99.5 to 90% by weight of Portland Cement; and
  0.5 to 10% by weight of the accelerator mixture.

Advantageously, the binder comprises:
  99 to 95% by weight of Portland Cement; and
  1 to 5% by weight of the accelerator mixture.

The Portland Cement is standard and compliant with the families described in the European Standard EN 197-1. For example a CEM1 52.5N or R, CEM2 cement of the types 32.5, 32.5R, 42.5 or 42.5R may be used. The cement may be of the HIR type (High Initial Resistance).

Advantageously, the Portland Cement is a cement, preferentially milled down to a fineness of at least 3,000 cm$^2$/g.

The level of soluble alkaline materials will preferably be less than 1%, advantageously less than 0.6%, by weight expressed as a Na2O equivalent. Advantageously, the amount of C4AF is less than 8% by weight, advantageously less than 4%, and the amount of C3S of the initial clinker is greater than 60% by weight.

The final amount of the accelerator mixture depends on the temperature of use of the concrete, on the exact method of application, of the level of resistances to be obtained, etc. Moreover, this amount is adjusted depending on the final amounts of the different components in the final concrete mixture.

The concrete may, in addition to the accelerator mixture, contain other types of additives currently used in concrete.

As an example of additives which may be used, mention may be made of: air-entraining agents, anti-foam agents, corrosion inhibitors, agents for reducing shrinkage, fibers, pigments, flow modifiers, hydration precursors, pumpability aids, reducing agents of alkaline reactions, strengthening agents, waterproofing compounds and mixtures thereof.

The compounds of the final concrete composition may be applied in the following order:
   according to a first embodiment, the totality of the components of the accelerator mixture are added at the start, during kneading of the concrete, at the concrete mixing plant; the cement and the complete accelerator mixture are mixed, i.e. a calcium salt, first and second superplasticizers. Kneading at the concrete mixing plant may be accomplished either in a fixed kneader or either in a concrete transit mix vehicle when the latter is directly used as a kneader. The invention is therefore directed to the method in which the totality of the components is introduced as soon as the fast binder is kneaded with the granulates and water; and
   according to a second embodiment, the calcium salt will be added at a later time relatively to the other components of the accelerator mixture, for example at the concrete transit mix vehicle before starting the concrete mixing plant, or during the mixing plant/building site trip, or at the building site just before casting. The invention is also therefore directed to the method in which the calcium salt is introduced after kneading of the other components of the fast hydraulic binder with granulates and water.

According to the second embodiment, the times selected for this delayed introduction may be from 10 to 90 minutes, preferably 20 to 60 minutes after mixing with the other components of the accelerator mixture, first a superplasticizer and/or second superplasticizer. The invention is therefore also directed to the method in which the calcium salt is introduced after 10 to 90 minutes, preferably 20 to 60 minutes.

The first embodiment will be preferred, since the various constituents (cement, components of the accelerator mixture) may then all be added and metered specifically in a single step from the concrete mixing plant.

Generally, the weight ratio of effective water over dry binder (E/C ratio) is generally comprised between 0.45 and 0.65.

The final composition comprises standard granulates (sands, gravels and/or stones). Preferentially, the constituents of the final composition have a size of less than or equal to 20 mm, preferentially less than or equal to 10 mm in the case of self-placing (or self-compacting) concretes. The composition may thus be easily pumped.

The dry weight ratio of granulates over binder is generally comprised between 4 and 5.

The concrete compositions according to the invention are easy to apply and are of low cost. They have suitable rheology, preferentially involving a workability time (after mixing) of a minimum of one hour and of a maximum from one hour and a half to two hours and very rapid setting. The workability of these concretes according to the invention is generally comprised between one and two hours. By workability time, is meant the time during which fluidity is maintained, which corresponds to the delay for initial setting; generally the slump values (fluid concrete) are at least 15 cm, preferably at least 18 cm.

The concrete according to the invention may be a fluid concrete, notably a fluid concrete having after 90 minutes a slump of at least 15 cm, preferably at least 18 cm. It may have a compression strength, as soon as four hours from the end of the kneading, of the order of at least 1 MPa and preferably at least 2 MPa, and at least 12 MPa at 24 hours, as measured on cylindrical specimens of dimensions 16 cm×32 cm.

The concrete according to the invention may also be a self-placing concrete, notably a self-placing concrete having after 90 minutes a spread of more than 650 mm. It may have a compression strength as soon as five hours from the end of the kneading, of the order of at least 1 MPa and preferably at least 2 MPa, and at least 12 MPa after 24 hours, measured on cylindrical specimens of dimensions 16 cm×32 cm.

When the kneading is applied in a concrete transit mix vehicle, the time is counted from the instant of the introduction of the last constituent of the concrete composition into the spindle mixer.

With both of these properties for maintaining workability and strong short term strengths, it is notably possible to make a precursor concrete composition of concrete and to then transport it onto a building site with a concrete transit mix vehicle, the composition rapidly setting once it is applied. With these properties of the binder, it is also possible to mechanically pump it thanks to its fluidity and to cast or pump it into a formwork, obtaining fast setting. There will thus be the possibility of removing forms and then rapidly making up the formwork so as to be able to proceed with fresh concrete casting.

The fast binder for fluid or self-placing (self-compacting) concrete of the invention may be totally pumped or cast, notably without any vibration in the case of self-compacting concrete, which for example makes it particularly suitable for making concrete shells.

The invention most particularly aims at making concrete shells, by casting and/or pumping. The invention is useful for making concrete shells at outdoor temperatures notably comprised between −5° C. and 30° C., in particular below 10° C. It will be recalled that a concrete shell is defined in masonry as "any vertical and solid wall in shuttered concrete".

Moreover, the invention also provides a method for notably making concrete shells by dual daily formwork removal at temperatures below or equal to 10° C., in particular by making use of the accelerator mixture according to the invention. Indeed, the invention according to another embodiment provides such a method which therefore gives the possibility of casting two concrete shells within one day, even at low temperatures. Indeed, according to the invention, it was now seen that the compositions according to the invention, by their fast setting properties even at a low temperature, allow this dual formwork removal to be achieved. It was also found that it is possible, insofar that the compositions are rapid and maintain their workability, to put an end to the traditional approach and to proceed with dual formwork removal even at low temperatures.

Figure 1:
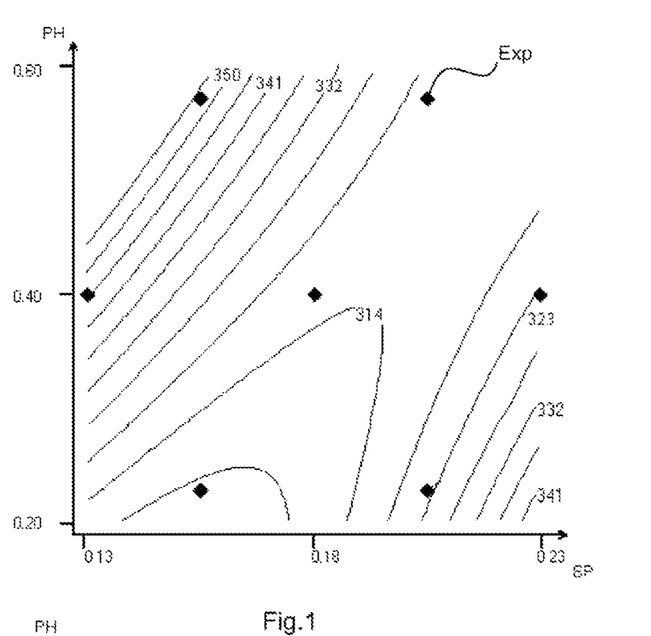
FIGS. 1 and 2 represent, at two different instants respectively, curves of the spreading level of a mortar versus concentrations of superplasticizers of the mortar.
Figure 2:
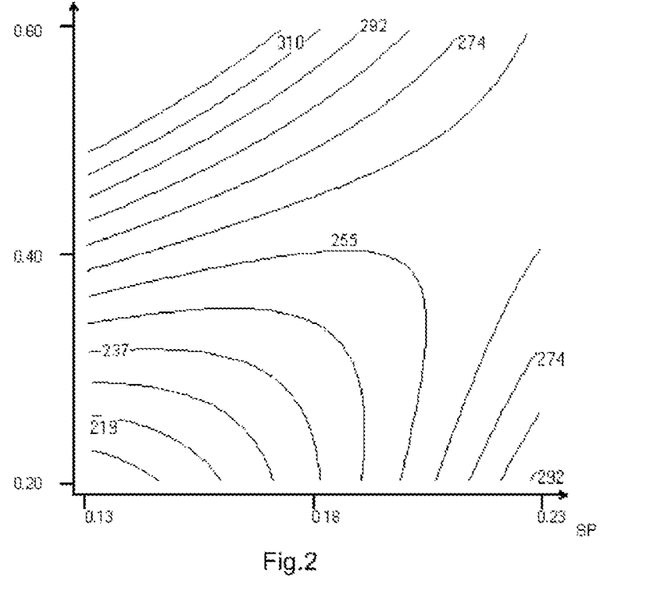
Figure 3:
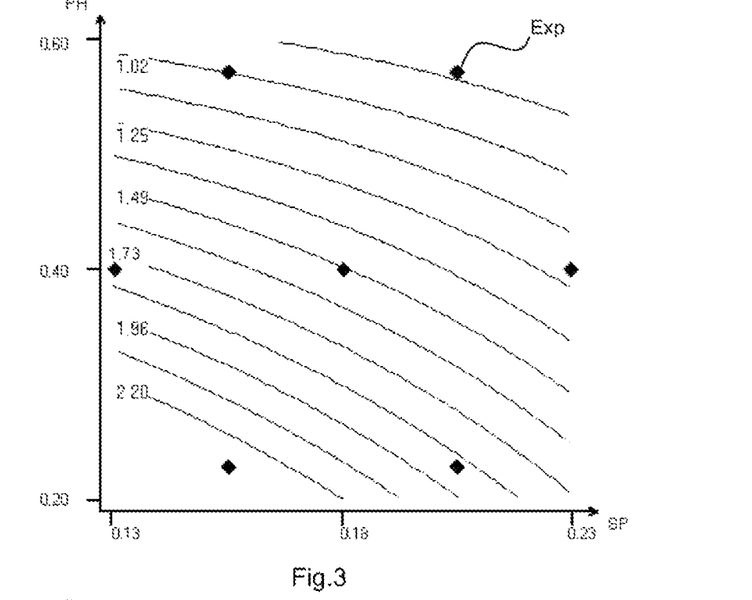
FIGS. 3 and 4 represent, at two different instants respectively, curves of the compression strength levels of a mortar versus concentrations of superplasticizers of the mortar.
Figure 4:
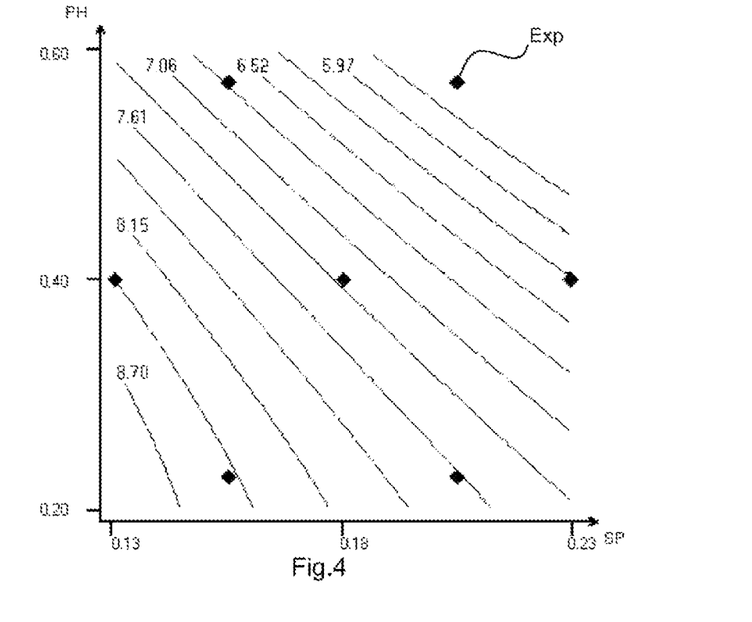
Figure 5:
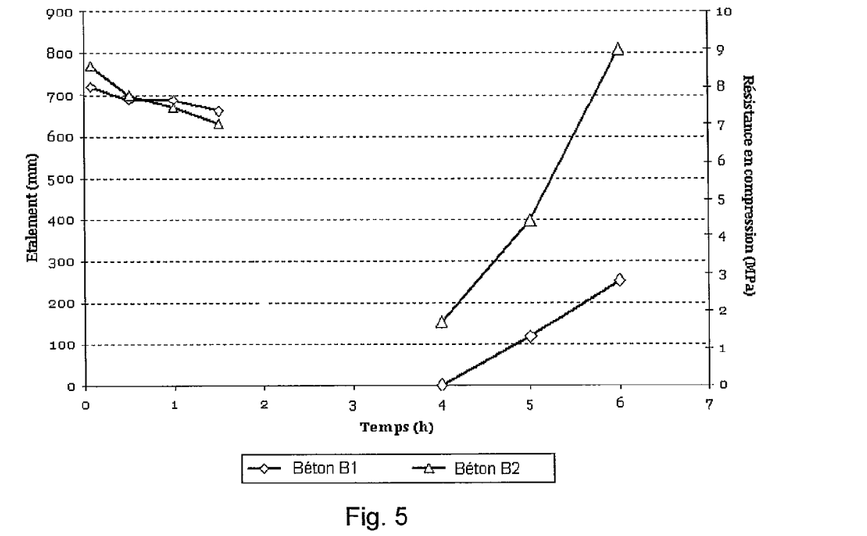
FIGS. 5 to 7 represent the time-dependent change in the spreading and the compression strength of several exemplary embodiments of concrete according to the present invention and of a reference concrete.
Figure 6:
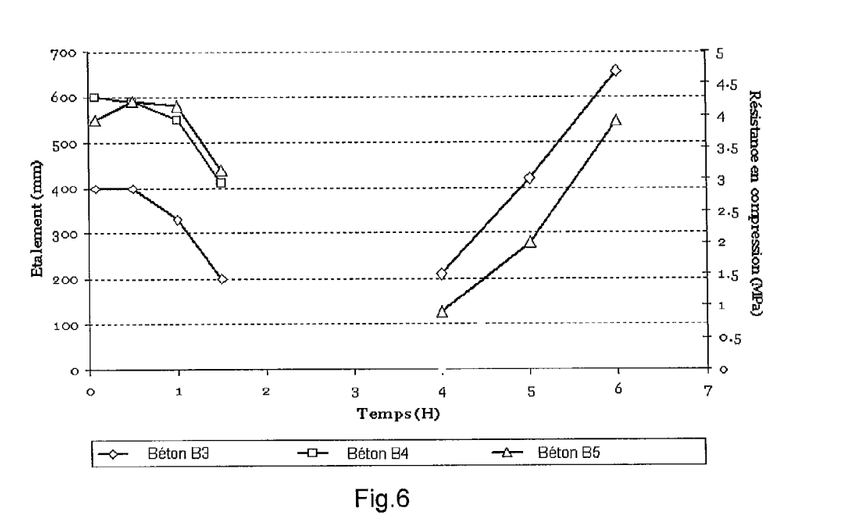
Figure 7:
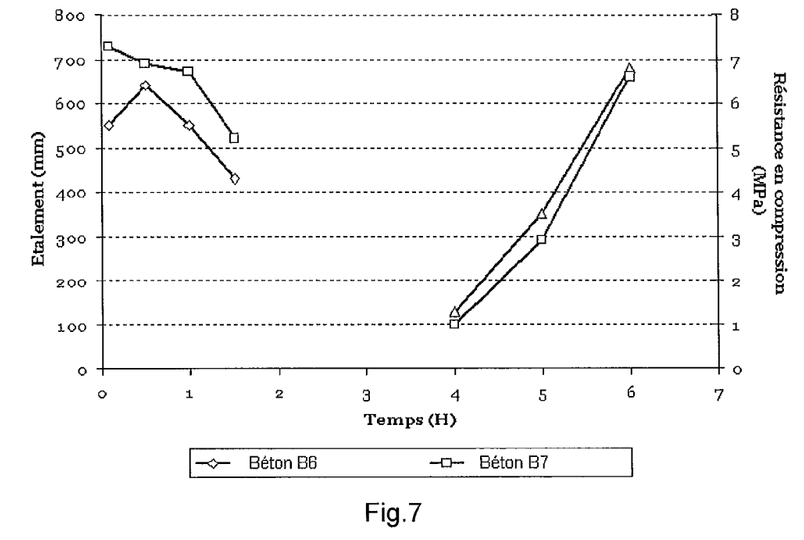
Figure 8:
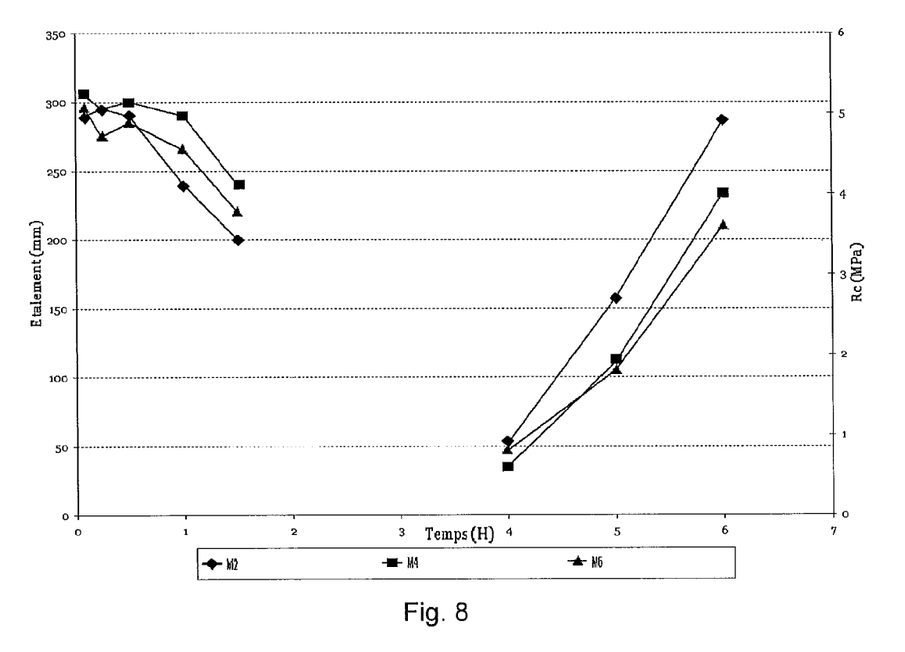
FIGS. 8 and 9 represent the time-dependent change in the spreading and in the compression strength of several exemplary embodiments of mortars according to the present invention and of a reference mortar.
Figure 9:
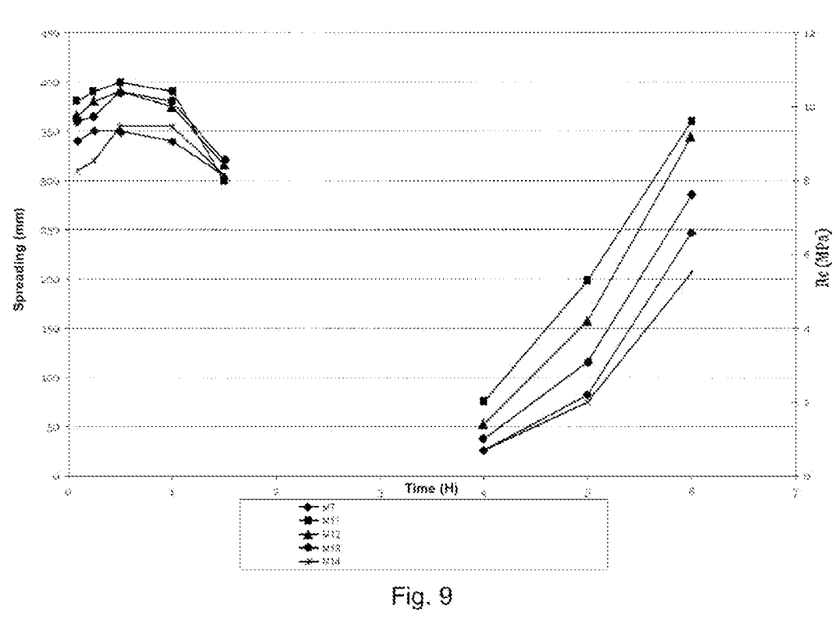

Examples, illustrating the invention without limiting the scope thereof, will be described in connection with the following figures wherein:

FIGS. 1 and 2 represent, at two different instants respectively, curves of the spreading level of a mortar versus concentrations of superplasticizers of the mortar;

FIGS. 3 and 4 represent, at two different instants respectively, curves of the compression strength levels of a mortar versus concentrations of superplasticizers of the mortar;

FIGS. 5 to 7 represent the time-dependent change in the spreading and the compression strength of several exemplary embodiments of concrete according to the present invention and of a reference concrete; and FIGS. 8 and 9 represent the time-dependent change in the spreading and in the compression strength of several exemplary embodiments of mortars according to the present invention and of a reference mortar.

In these examples, the spreading values are measured according to the operating procedure described in document "specification and guidelines for self-compacting concrete, EFNARC, February 2002, P19-23" and the slump values are measured with a cone according to a ½ scale relatively to the Abrams cone, in the case of concrete mortars.

(1) Time-dependent change in the spreading and compression strength of the concrete versus concentrations of superplasticizers.

A mortar is prepared according to the following formulation for making one liter of mortar:

| | |
|---|---|
| Portland Cement CEM I | 550.9 g |
| Orgon Limestone Filler | 78.7 g |
| 0-4 sand from the Mauzac site | 1454.5 g |
| Total water | 255.9 g |
| Calcium nitrite | 49.5 g |
| (i.e., 2.5% by weight of dry extract based on the amount of hydraulic binder). | |

The cement used is cement from Le Havre produced by Lafarge, which is of the CEM1 52.5 type according to the EN197-1 Standard. The first superplasticizer, noted as SP, is the product marketed by BASF under the name of Glenium 27. The second superplasticizer corresponds to the PH polymer described earlier.

More specifically, a series of tests is conducted by varying the concentration of the first superplasticizer SP and the concentration of the second superplasticizer PH, these concentrations being expressed as a percentage of dry extract relatively to the amount of hydraulic binder. The results of these tests are grouped in the following table 1:

From the tests of Table 1, it is possible to obtain by simulation the time-dependent change in the spreading at given instants versus the SP and PH concentrations and the time-dependent change of the compression strength RC at given instants versus the SP and PH concentrations. The simulation may be applied via the software package marketed by LPRAI under the name of NemrodW by using modeling of the planar type with Doehlert's response surface.

FIGS. 1 and 2 respectively represent curves of the levels of spreading of the mortar according to an exemplary embodiment of the invention versus concentrations of the first superplasticizer SP and of the second superplasticizer PH after 30 minutes and 120 minutes. FIGS. 3 and 4 respectively represent curves of compression strength levels of the mortar according to an exemplary embodiment versus concentrations of the first superplasticizer SP and of the second superplasticizer PH after 4 hours and after 24 hours. In FIGS. 1, 3 and 4, the rhombuses designated by the reference EXP represent the experimental points of Table 1.

As this appears in FIGS. 1 and 2, advantageously, the spreading of the mortar according to an exemplary embodiment remains greater than 210 mm at a term of 2 hours regardless of the relevant mortar. Further, the present invention allows reduction in the concentration of the first superplasticizer SP while retaining or increasing the compression strength RC after 6 hours.

With the present invention it is possible to obtain a workability time of the mortar of more than 2 hours without causing any delay for acquiring strength in the early ages. Therefore, a workability time from 1 hour 30 minutes to 2 hours is simultaneously obtained while retaining or even improving the rapidity of acquiring strengths in the early ages. One explanation would be that the first superplasticizer more substantially participates in delaying the acquisition of strength in the early ages than the second superplasticizer. Consequently, as the present invention allows a reduction in the concentration of the first superplasticizer, the rapidity for acquiring strength at early ages is retained or even improved as compared with a mortar only comprising the first superplasticizer in a larger concentration. Further, with the present invention, it is nevertheless possible by means of the fluidifying action of the second superplasticizer which increases with time, to obtain a workability time of the mortar of more than 2 hours.

(2) Influence of the nature of the cement for making concrete according to exemplary embodiments of the invention with cements made in Europe by Lafarge For making concrete in the following examples, the following composition called composition F1 is used:

TABLE 1

| | | Spreading (mm) | | | | | | RC (MPa) | | | |
|---|---|---|---|---|---|---|---|---|---|---|---|
| SP % | PH % | 5 min | 15 | 30 | 60 | 90 | 120 | 4 h | 5 h | 6 h | 24 h |
| 0.18 | 0.40 | 290 | 320 | 315 | 295 | 280 | 255 | 1.5 | 4.3 | 7.3 | 32.8 |
| 0.13 | 0.40 | 275 | 350 | 350 | 330 | 295 | 280 | 1.9 | 5.3 | 8.7 | 36.7 |
| 0.23 | 0.40 | 295 | 325 | 315 | 290 | 280 | 255 | 1.1 | 3.3 | 6.0 | 33.3 |
| 0.16 | 0.23 | 250 | 310 | 300 | 280 | 270 | 210 | 2.2 | 5.1 | 8.2 | 32.8 |
| 0.21 | 0.23 | 325 | 340 | 330 | 315 | 290 | 270 | 2.0 | 4.6 | 7.9 | 33 |
| 0.16 | 0.57 | 315 | 345 | 340 | 335 | 325 | 310 | 0.9 | 3.3 | 6.5 | 32.6 |
| 0.21 | 0.57 | 315 | 330 | 325 | 320 | 295 | 285 | 1.0 | 3.0 | 5.7 | 31.9 |

| | |
|---|---|
| Portland Cement CEM I | 320 kg |
| Limestone filler | 80 kg |
| 0-4 sand from the St Bonnet de Mure site | 840 kg |
| 4/10 gravels 1 from St Bonnet de Mure site | 520 kg |
| 11/22 gravels 2 from St Bonnet de Mure site | 440 kg |
| Water | 158 L |

The limestone filler corresponds to the product marketed by Omya under the name of Betocarb P2.

A reference concrete B1 and an exemplary embodiment of a concrete according to the invention B2 are made with the composition F1 by using a cement, produced by Lafarge at the cement works of Le Teil, this cement being of the CEM 1 52.5R type according to the EN197-1 standard.

The reference concrete B1 is made by adding to the composition F1 the following additives, the percentages being expressed based on the weight of the cement and of the limestone filler:

| | |
|---|---|
| Calcium nitrite | 1.6% |
| Sodium bisulfite formaldehyde | 0.21% |
| Superplasticizers: CHRYSO Fluid Optima 203 | 0.25% |
| CHRYSO Plast 209 | 0.1% |

The products CHRYSO Fluid Optima 203 and CHRYSO Plast 209 are superplasticizers marketed by CHRYSO.

The concrete B2 is made by adding to the composition F1 the following additives, the percentages being expressed based on the weight of the cement and of the limestone filler:

| | |
|---|---|
| Calcium nitrite | 1.6% |
| First superplasticizer SP: | |
| CHRYSO Fluid Optima 203 | 0.18% |
| Second superplasticizer PH | 0.2% |

The results obtained at 20° C. are grouped in Table 2 below and are illustrated in FIG. 5.

TABLE 2

| Concrete | Spreading (mm) | | | | RC (MPa) | | |
|---|---|---|---|---|---|---|---|
| | 5 min | 30 min | 60 min | 90 min | 4 h | 5 h | 6 h |
| B1 | 720 | 690 | 690 | 660 | 0 | 1.3 | 2.8 |
| B2 | 770 | 700 | 670 | 630 | 1.7 | 4.4 | 9 |

For spreading of the same magnitude, the concrete B2 according to the invention according to the invention contains a less significant amount of the superplasticizer CHRYSO Fluid Optima 203 than the reference concrete B1. Further, the mechanical strengths at a term of 6 hours of the B2 concrete are clearly improved relatively to the concrete B1.

A reference concrete B3 and concretes B4 and B5 according to the invention are made with the composition F1 by using a cement produced by Lafarge at the cement works of Saint Pierre La Cour, this cement being of the CEM1 52.5 N type according to the EN 197-1 standard.

The reference concrete B3 is made by adding to the composition F1 the following additives, the percentages being expressed, based on the weight of the cement and of the limestone filler:

| | |
|---|---|
| Calcium nitrite | 2.7% |
| Sodium bisulfite formaldehyde | 0.215% |
| Superplasticizer B201F | 0.18% |

The product B201F is a superplasticizer marketed by BASF.

The concrete B4 is made by adding to the composition F1 the following additives, the percentages being expressed based on the weight of the cement and of the limestone filler:

| | |
|---|---|
| Calcium nitrite | 2.7% |
| First superplasticizer SP: B201F | 0.18% |
| Second superplasticizer PH | 0.12% |

The concrete B5 is made by adding to the composition F1 the following additives, the percentages being expressed based on the weight of the cement and of the limestone filler:

| | |
|---|---|
| Calcium nitrite | 2.7% |
| First superplasticizer SP: Glenium 27 | 0.18% |
| Second superplasticizer PH | 0.12% |

The results obtained at 20° C. are grouped in the Table 3 below and are illustrated in FIG. 6.

TABLE 3

| Concrete | Spreading (mm) | | | | RC (MPa) | | |
|---|---|---|---|---|---|---|---|
| | 5 min | 30 | 60 | 90 | 4 h | 5 h | 6 h |
| B3 | 400 | 400 | 330 | 200 | 1.5 | 3 | 4.7 |
| B4 | 600 | 590 | 550 | 410 | 0 | 1.6 | 3.1 |
| B5 | 550 | 590 | 580 | 440 | 0.9 | 2 | 3.9 |

The concrete B4 according to the invention has after 90 mins, greater spreading than the one obtained with concrete B3, with a difference of 210 mm for a spreading of 410 mm. Also, the concrete B5 according to the invention has after 90 mins a spreading greater than the one obtained with concrete B3, with a difference of 240 mm for a spreading of 440 mm. The mechanical compression strengths at a term of 6 hours of the concretes B4 and B5 are of the same magnitude as those of the concrete B3. Further, for spreading of the same magnitude, the mechanical compression strengths of the concrete B5 (containing as a first superplasticizer SP, Glenium 27) are greater than that of concrete B4 (containing as a first superplasticizer SP, B201F).

A reference concrete B6 and a concrete according to the invention B7 were made with the composition F1 by using cement produced by Lafarge at the cement works of Cauldon (Great Britain), this cement being of the CEM1 52.5 N type according to the EN197-1 standard.

The reference concrete B6 is made by adding to the composition F1 the following additives, the percentages being expressed based on the weight of the cement and of the limestone filler:

| | | |
|---|---|---|
| Calcium nitrite | | 2% |
| Sodium bisulfite formaldehyde | | 0.15% |
| Superplasticizers: | CHRYSO Fluid Optima 206 | 0.27% |
| | CHRYSO Plast 209 | 0.08% |

The product CHRYSO Fluid Optima 206 is a superplasticizer marketed by CHRYSO.

The concrete B7 is made by adding to the composition F1 the following additives, the percentages being expressed, based on the weight of the cement and of the limestone filler:

| | |
|---|---|
| Calcium nitrite | 2% |
| First superplasticizer SP: CHRYSO Fluid Optima 206 | 0.25% |
| Second superplasticizer PH: | 0.15% |

The results obtained at 20° C. are grouped in the Table 4 below and are illustrated in FIG. 7.

TABLE 4

| | Spreading (mm) | | | | RC (MPa) | | |
|---|---|---|---|---|---|---|---|
| Concrete | 5 min | 30 min | 60 | 90 | 4 h | 5 h | 6 h |
| B6 | 550 | 640 | 550 | 430 | 1.3 | 3.5 | 6.8 |
| B7 | 730 | 690 | 670 | 520 | 1 | 2.9 | 6.6 |

The concrete B7 according to the invention has after 90 min, a spreading clearly greater than that obtained with the concrete B6, with a difference of 90 mm for a spreading of 520 mm. Further, the mechanical strength at a term of 6 hours of the concrete B7 are of the same magnitude as those of the concrete B6.

(3) Influence of the nature of the cement for making concretes according to exemplary embodiments of the invention with cements made outside Europe.

For making the concretes B8 and B9, a cement produced by Lafarge at the Richmond Cement Works (Canada) is used and the following composition called composition F2 is used:

| | |
|---|---|
| Portland Cement CEM I | 340 kg/m$^3$ |
| Flying ash | 85 kg/m$^3$ |
| Sand from the Earle Creek site | 820 kg/m$^3$ |
| 5 mm gravels 1 from the Earle Creek site | 300 kg/m$^3$ |
| 14 mm gravels 2 from the Earle Creek site | 380 kg/m$^3$ |
| 20 mm gravels 3 from the Earle Creek site | 350 kg/m$^3$ |
| Water | 139 kg/m$^3$ |

The flying ash is produced by Sundance.

The reference concrete B8 is made by adding to the composition F2 the following additives, the percentages being expressed based on the weight of the cement and of the limestone filler:

| | |
|---|---|
| Calcium nitrite | 17.5 kg/m$^3$ |
| Sodium bisulfite formaldehyde | 1.42 kg/m$^3$ |
| Superplasticizers: CHRYSO Fluid Optima 203 | 4.00 kg/m$^3$ |
| CHRYSO Fluid Optima 100 | 0.50 kg/m$^3$ |

The product CHRYSO Fluid Optima 100 is a superplasticizer marketed by CHRYSO.

The concrete B9 is made by adding to the composition F2 the following additives, the percentages being expressed based on the weight of the cement and of the limestone filler:

| | |
|---|---|
| Calcium nitrite | 17.5 kg/m$^3$ |
| First superplasticizer SP: | |
| CHRYSO Fluid Optima 203 | 3.00 kg/m$^3$ |
| CHRYSO Fluid Optima 100 | 0.38 kg/m$^3$ |
| Second superplasticizer PH | 1.89 kg/m$^3$ |

The results obtained at 20° C. are grouped in the Table 5 hereafter.

TABLE 5

| | Spreading (mm) | | | | RC (MPa) | | |
|---|---|---|---|---|---|---|---|
| Concrete | After mix- | 30 | 60 | 90 | 4 h | 5 h | 6 h |
| B8 | 680 | 670 | 670 | 470 | 0.6 | 1.2 | 2.3 |
| B9 | 670 | 665 | 650 | 650 | 0.5 | 1 | 1.7 |

The concrete B9 according to the invention has after 90 mins, a spreading clearly greater than that obtained with the concrete B8, with a difference of at least 180 mm for spreading of 650 mm. Further, the mechanical strengths at the term of 6 hours for the concrete B9 are of the same magnitude as those of the concrete B8.

For making concrete B10 and B11, a cement produced by Lafarge at the Exshaw Cement Works (Canada) is used and the following composition called composition F3 is used:

| | |
|---|---|
| Portland Cement CEM I | 350 kg/m$^3$ |
| Flying ash | 85 kg/m$^3$ |
| Sand from the Calgary site | 878 kg/m$^3$ |
| 12.5 mm gravels 1 from the Calgary site | 438 kg/m$^3$ |
| 20 mm gravels 2 from the Calgary site | 464 kg/m$^3$ |
| Water | 134 kg/m$^3$ |

The flying ash is produced by Sundance.

The reference concrete B10 is made by adding to the composition F3 the following additives, the percentages being expressed based on the weight of the cement and of the limestone filler:

| | |
|---|---|
| Calcium nitrite | 22.50 kg/m$^3$ |
| Sodium bisulfite formaldehyde | 1.42 kg/m$^3$ |
| Superplasticizers: CHRYSO Fluid Optima 203 | 4.00 kg/m$^3$ |
| CHRYSO Fluid Optima 100 | 0.50 kg/m$^3$ |

The concrete B11 is made by adding to the composition F3, the following additives, the percentages being expressed based on the weight of the cement and of the limestone filler.

| | |
|---|---|
| Calcium nitrite | 22.5 kg/m$^3$ |
| First superplasticizer SP: | |
| CHRYSO Fluid Optima 203 | 3.00 kg/m$^3$ |
| CHRYSO Fluid Optima 100 | 0.38 kg/m$^3$ |
| Second superplasticizer PH: | 1.89 kg/m$^3$ |

The results obtained at 20° C. are grouped in the Table 6 hereafter.

TABLE 6

| | Spreading (mm) | | | | RC (MPa) | | |
|---|---|---|---|---|---|---|---|
| Concrete | After mix- | 30 | 60 | 90 | 4 h | 5 h | 6 h |
| B10 | 625 | 640 | 620 | 480 | 0.9 | 1.8 | 3.7 |
| B11 | 685 | 640 | 640 | 540 | 0.4 | 1.5 | 3.8 |

The concrete B11 according to the invention has after 90 mins, a spreading clearly greater than that obtained with the concrete B10, with a difference of 60 mm for a spreading of 540 mm. Further, the mechanical strengths at a term of 6 hours of the concrete B11 are of the same magnitude as those of concrete B10.

For making the concretes B12 and B11, a cement produced by Lafarge at the Richmond Cement Works (Canada) is used and the following composition called composition F4 is used:

| | |
|---|---|
| Portland Cement CEM I | 340 kg/m³ |
| Flying ash | 85 kg/m³ |
| Sand | 834 kg/m³ |
| 5 mm gravels 1 | 317 kg/m³ |
| 14 mm gravels 2 | 391 kg/m³ |
| 20 mm gravels 3 | 284 kg/m³ |
| Water | 134 kg/m³ |

The flying ash is produced by Sundance. The sand and the gravels 1, gravels 2 and gravels 3 are produced by Cewe.

The reference concrete B12 is made by adding to the composition F4 the following additives, the percentages being expressed based on the weight of the cement and of the limestone filler:

| | | |
|---|---|---|
| Calcium nitrite | | 17.50 kg/m³ |
| Sodium bisulfite formaldehyde | | 1.42 kg/m³ |
| Superplasticizers: | CHRYSO Fluid Optima 203 | 4.00 kg/m³ |
| | CHRYSO Fluid Optima 100 | 0.50 kg/m³ |

The concrete B13 is made by adding to the previous composition the following additives, the percentages being expressed based on the weight of the cement and of the limestone filler:

| | |
|---|---|
| Calcium nitrite | 22.5 kg/m³ |
| First superplasticizer SP: | |
| CHRYSO Fluid Optima 203 | 3.00 kg/m³ |
| CHRYSO Fluid Optima 100 | 0.38 kg/m³ |
| Second superplasticizer PH | 1.89 kg/m³ |

The results obtained at 20° C. are grouped in the Table 7 hereafter.

TABLE 7

| | Slump (mm) | | | | | RC (MPa) | | |
|---|---|---|---|---|---|---|---|---|
| Concrete | After mixing | 30 min | 60 min | 90 min | 120 min | 4 h | 5 h | 6 h |
| B12 | 270 | 265 | 250 | 220 | x | 1 | 1.7 | 3.8 |
| B13 | 280 | 275 | 275 | 275 | 255 | 0.6 | 1.2 | 2.7 |

The concrete B13 according to the invention has after 90 mins a slump clearly greater than that obtained with the concrete B12, with a difference of 55 mm for a slump of 275 mm. Further, the concrete B13 according to the invention has after 120 mins a slump of 255 mm. Further, the mechanical strengths at the term of 6 hours of the concrete B13 are of the same magnitude as those of the concrete B12.

For making concretes B14 and B15, a cement produced by Lafarge at the Lehigh Cement Works is used and the composition F4 is used.

The reference concrete B14 is made by adding to the previous composition the following additives, the percentages being expressed based on the weight of the cement and of the limestone filler:

| | |
|---|---|
| Calcium nitrite | 20.00 kg/m³ |
| Sodium bisulfite formaldehyde | 1.42 kg/m³ |
| Superplasticizers: | |
| CHRYSO Fluid Optima 203 | 4.00 kg/m³ |
| CHRYSO Fluid Optima 100 | 0.50 kg/m³ |

The concrete B15 is made by adding to the previous composition the following additives, the percentages being expressed based on the weight of the cement and of the limestone filler:

| | |
|---|---|
| Calcium nitrite | 20.00 kg/m³ |
| First plasticizer SP: | |
| CHRYSO Fluid Optima 203 | 3.00 kg/m³ |
| CHRYSO Fluid Optima | 0.38 kg/m³ |
| Second superplasticizer PH | 1.89 kg/m³ |

The results obtained at 20° C. are grouped in the Table 8 hereafter.

TABLE 8

| | Spreading (mm) | | | | RC (MPa) | | |
|---|---|---|---|---|---|---|---|
| Concrete | After mixing | 30 | 60 | 90 | 4 h | 5 h | 6 h |
| B14 | 680 | 670 | 590 | 360 | 0.6 | 1.7 | 2.9 |
| B15 | 670 | 670 | 650 | 400 | 0.9 | 2.5 | 3.3 |

The concrete B15 according to the invention has after 90 mins, a spreading clearly greater than that obtained with the concrete B10, with a difference of 40 mm for a spreading of 400 mm. Further, the mechanical strengths at a term of 6 hours of the concrete B15 are slightly greater than those of the concrete B14.

The example described earlier in connection with Tables 4 to 8 show that, all conditions being moreover equal, the hydraulic binder according to the invention allows the making of a concrete having a long duration for maintaining workability and leading to rapid acquisition of short term mechanical strengths independently of the cement supply source.

(4) Influence of the nature of the first superplasticizer.

A concrete mortar equivalent to a concrete having composition F1 is made. The determination of an equivalent concrete mortar is described in the article entitled "La méthode du mortier de béton équivalent (MBE)-Un nouvel outil d'aide à la formulation des bétons adjuvantés" by A. Schwarzentruber and published in the review Materials and Structures Volume 33/Number 8, October 2000.

The formulation of the mortar is the following for making one liter of mortar.

| | |
|---|---|
| Portland Cement CEM I | 498.2 g |
| Limestone filler | 124.6 g |
| 0-5 sand | 1372.0 g |
| Total water | 259.2 g |

Mortars M1 to M6 are made with a cement produced by Lafarge at the Saint Pierre la Cour Cement Works, this cement being of the CEM 1 52.5N type according to the EN 197-1 Standard. The calcium nitrite is called SET and the sodium bisulfite formaldehyde is called FOR.

Different tests were conducted and grouped in the following Table 9. For the mortars M2, M4 and M6, these tests are further illustrated in FIG. 8:

TABLE 9

| Mortar | SET % | FOR % | PH % | SP | SP | Slump (mm) | | | | | RC (MPa) | | |
|---|---|---|---|---|---|---|---|---|---|---|---|---|---|
| | | | | | | 5 min | 10 min | 30 min | 60 min | 90 min | 4 h | 5 h | 24 h |
| M1 | 2.7 | 0.225 | 0 | B201F | 0.18 | 200 | 200 | 200 | 160 | — | 2.2 | 5.1 | 7.9 |
| M2 | 2.7 | 0 | 0.12 | B201F | 0.18 | 290 | 295 | 290 | 240 | 200 | 0.9 | 2.7 | 4.9 |
| M3 | 2.7 | 0 | 0.15 | CHRYSO Fluid | 0.17 | 310 | 320 | 320 | 285 | 225 | 1.5 | 3.7 | 6.6 |
| M4 | 2 | 0 | 0.15 | CHRYSO Fluid | 0.17 | 305 | 295 | 300 | 290 | 240 | 0.8 | 1.8 | 3.6 |
| M5 | 2 | 0 | 0.15 | CHRYSO Fluid | 0.15 | 290 | 270 | 275 | 240 | 180 | 1.1 | 2.9 | 5.2 |
| M6 | 1.8 | 0 | 0.15 | CHRYSO Fluid | 0.15 | 295 | 275 | 285 | 265 | 220 | 0.6 | 1.9 | 4 |

The mortars M7 to M14 are made with a cement produced by Lafarge at the Le Teil Cement Works, this cement being of the CEM1152.5R type according to the EN 197-1 standard.

Advantageously, the mortar M6 comprises a lower concentration of calcium nitrite than the reference mortar M1 while having the same mechanical performances as the reference mortar M1.

Different tests are conducted and grouped in the following Table 10. The product CHRYSO Fluid Optima 203 is called SP1 and the product CHRYSO Plast 209 is called SP2. For the mortars M7, M11, M12, M13 and M14, these tests are illustrated in FIG. 9.

Advantageously the mortar M14 comprises a lower calcium nitrite concentration than the reference mortar M7 while having the same mechanical performances as the reference mortar M7.

TABLE 10

| Mortar | SET % | FOR % | PH % | SP1 % | SP2 % | Slump in mm | | | | | RC en MPa | | |
|---|---|---|---|---|---|---|---|---|---|---|---|---|---|
| | | | | | | 5 min | 10 min | 30 min | 60 min | 90 min | 4 h | 5 h | 24 h |
| M7 | 1.6 | 0.21 | 0 | 0.25 | 0.1 | 340 | 350 | 350 | 340 | 305 | 0.7 | 2.2 | 6.6 |
| M8 | 1.6 | 0 | 0.2 | 0.18 | | 400 | 410 | 400 | 390 | 375 | 1.9 | 6.9 | 11 |
| M9 | 1.6 | 0 | 0.1 | 0.18 | | 380 | 370 | 380 | 340 | 205 | 2.2 | 6.4 | 9.7 |
| M10 | 1.4 | 0 | 0.1 | 0.18 | | 390 | 370 | 360 | 310 | 200 | 1.9 | 6.1 | 9.9 |
| M11 | 1.4 | 0 | 0.15 | 0.15 | | 380 | 390 | 400 | 390 | 300 | 2 | 5.3 | 9.6 |
| M12 | 1.2 | 0 | 0.15 | 0.15 | | 365 | 380 | 390 | 375 | 315 | 1.4 | 4.2 | 9.2 |
| M13 | 1 | 0 | 0.15 | 0.13 | | 360 | 365 | 390 | 380 | 320 | 1 | 3.1 | 7.6 |
| M14 | 1 | 0 | 0.15 | 0.13 | 0.05 | 310 | 320 | 355 | 355 | 305 | 0.7 | 2 | 5.5 |

In the drawings and specification, there have been disclosed typical embodiments on the invention and, although specific terms have been employed, they have been used in a generic and descriptive sense only and not for purposes of limitation, the scope of the invention being set forth in the following claims.

The invention claimed is:
1. A hydraulic binder comprising:
cement;
at least one first superplasticizer;
a water-soluble calcium salt; and
at least one second superplasticizer different from the first superplasticizer and comprising a main chain and pendant groups connected to the main chain wherein at least 30% of side chains separate from the main chain in a basic medium at 20° C., the second superplasticizer comprising at least one polymer hydrolyzable in a basic medium, and wherein the second superplasticizer is obtained:
by radical polymerization of at least one ionic or ionisable monomer selected from phosphonic, sulfonic or carboxylic monomers and of at least one monomer selected from polyethylene glycol (PEG) (meth)acrylate, polyethylene glycol maleate, polyethylene glycol vinyl ether or polyethylene glycol allyl monomers, the molecular weight of which is between 100 and 10,000; or
in an equivalent way by a post-esterification method by reacting alcohols or polyoxyalkylamines on a polymer having carboxylic function in order to allow grafting;
wherein concretes prepared from the binder have a workability duration from 1 hour to 2 hours;
wherein (i) a fluid concrete prepared from the binder has a compression strength of at least 1 MPa after 4 hours, (ii) a self-placing concrete prepared from the binder has a compression strength of at least 1 MPa after 5 hours, or both (i) and (ii);
wherein the binder does not comprise any formaldehyde and any formic derivatives.

2. The binder according to claim 1, wherein the hydrolyzable monomers are selected from acrylamide and its derivatives, acrylonitrile and its derivatives, alkyl acrylates, hydroxyalkyl acrylates, polyethylene glycol acrylates, copolymerizable carboxylic anhydrides and copolymerizable imides.

3. The binder according to claim 1, wherein the hydrolyzable polymer is a polyalkylene oxide polycarboxylate.

4. The binder according to claim 1, comprising based on the dry weight of the binder:
99.5 to 90% by weight of cement;
0.5 to 10% by weight of the components considered as a whole;
of said at least first superplasticizer;
of said calcium salt; and
of said at least second superplasticizer.

5. The binder according to claim 4, comprising based on the dry weight of the binder:
   99 to 95% by weight of cement; and
   1 to 5% by weight of the components considered as a whole;
   of said at least first superplasticizer;
   of said calcium salt; and
   of said at least second superplasticizer.

6. The binder according to claim 1, wherein the first superplasticizer is a polyalkylene oxide polycarboxylate.

7. The binder according to claim 1, wherein the calcium salt is calcium nitrite.

8. The binder according to claim 1, wherein the amount of water soluble calcium salt in the binder is comprised between 0.5 and 10% by weight based on the binder.

9. The binder according to claim 1, wherein the amount of calcium salt in the binder is comprised between 1.5 and 5% by weight based on the binder.

10. The binder according to claim 1, wherein the amount of the second superplasticizer, considered as a dry extract, relative to the calcium salt, is comprised between 1 and 10% of the amount of calcium salt.

11. The binder according to claim 1, wherein the amount of the second superplasticizer, considered as a dry extract, relative to the calcium salt, is comprised between 2 and 5% of the amount of calcium salt.

12. A concrete comprising a hydraulic binder according to claim 1 mixed with water.

13. The binder according to claim 1, wherein the PEG allyl monomer is PEG methyl ether monomer in the terminal position.

14. The binder according to claim 8, wherein the PEG allyl monomer is PEG methyl ether monomer in the terminal position.

15. The binder according to claim 1, wherein the second superplasticizer is obtained by radical polymerization method including one or more other hydrolyzable or non-hydrolyzable monomers.

16. The binder according to claim 8, wherein the second superplasticizer is obtained by radical polymerization method including one or more other hydrolyzable or non-hydrolyzable monomers.

17. The binder according to claim 1, wherein the hydrolyzable polymer comprises hydrolyzable functions selected from ester units.

18. The concrete according to claim 12 wherein the ratio of effective water over dry binder is comprised of between 0.45 and 0.65.

19. The concrete according to claim 12 wherein the concrete has a workability duration from 1 hour to 2 hours.

20. The concrete according to claim 12 wherein the concrete in a fluid form has a compression strength of at least 1 MPa after 4 hours.

21. The concrete according to claim 12 wherein the concrete in a self-pacing form has a compression strength of at least 1 MPa after 5 hours.

* * * * *